United States Patent [19]

Kanarian et al.

[11] Patent Number: 5,131,068
[45] Date of Patent: Jul. 14, 1992

[54] THICKNESS VARIATION INSENSITIVE FREQUENCY DOUBLING POLYMERIC WAVEGUIDE

[75] Inventors: Garo Kanarian, Berkley Heights, N.J.; Robert Norwood, Bethlehem, Pa.

[73] Assignee: Hoechst Celanese Corp., Somerville, N.J.

[21] Appl. No.: 601,841

[22] Filed: Oct. 23, 1990

[51] Int. Cl.$^5$ ............................................. G02B 6/00
[52] U.S. Cl. .................................... 385/141; 385/130; 385/14; 385/8; 385/122; 359/326
[58] Field of Search .................. 372/7, 21, 22; 385/2, 385/8, 14, 130, 141, 122; 359/326-332

[56] References Cited

U.S. PATENT DOCUMENTS

| | | | |
|---|---|---|---|
| 3,772,528 | 11/1973 | Anderson | 359/332 |
| 3,856,379 | 12/1974 | Burns et al. | 385/122 |
| 4,236,785 | 12/1980 | Papuchon et al. | 385/122 |
| 4,877,298 | 10/1989 | Teng et al. | 385/2 |
| 4,953,943 | 9/1990 | Miyazaki et al. | 385/122 |
| 4,955,977 | 9/1990 | Dao et al. | 385/141 |
| 4,971,416 | 11/1990 | Khanavian | 385/122 |
| 5,062,361 | 3/1991 | De Martino et al. | 385/122 |

Primary Examiner—Georgia Y. Epps
Attorney, Agent, or Firm—P. S. Kalyanaraman

[57] ABSTRACT

In one embodiment this invention provides a frequency doubling optical waveguide consisting of a substrate-supported polymeric thin film which exhibits second order nonlinear optical response and is thickness variation insensitive, and which has a periodic structure for quasi-phase matching of propagating laser wave radiation. In a preferred embodiment the waveguide has a two-dimensional channel structure for intensified single mode wave transmission.

8 Claims, 3 Drawing Sheets

THICKNESS VARIATION INSENSITIVE FREQUENCY DOUBLING POLYMERIC WAVEGUIDE

BACKGROUND OF THE INVENTION

There is an increasing interest in the development of a compact diode laser source in the 400-500 nm range for advanced applications such as optical disk technology, laser scanning, laser printing, and medical protocols.

There are several possible approaches to a prospective short wavelength, diode laser source. The traditional diode materials such as the ternary and quaternary compounds of In, Ga, As, Al, P, and Sb do not have a direct energy gap high enough to produce a short wavelength laser. A number of other laser materials have been studied for development of diode laser sources in the blue wavelength region. These materials include II-VI semiconductors, quantum well materials, and other wide band gap semiconductors such as cadmium sulfide (CdS). Although the blue quantum well structure shortens the lasing wavelength, it requires a cryogenic condition for lasing. There also has been investigation of II-VI wide-gap superlattices with the goal of achieving diode emission in the blue-green region of the spectrum, but these materials have only produced optically pumped lasers requiring cooling at liquid nitrogen temperature. Other semiconductors that are known to lase in the 450-500 nm range are CdS, ZnSe, ZnCdS, and CdSeS. Lasers of these materials require either optical or electron beam pumping for their operation.

In view of the impracticality of a direct diode laser source, attractive alternatives involve frequency conversion of available diode laser sources, either by frequency doubling or parametric up-conversion. The traditional frequency conversion techniques utilize phase matching of input beams and harmonic waves in second order optical crystals such as potassium dihydrogen phosphate (KDP and KD*P), $LiNbO_3$ and $LiIO_3$. However, because of the relatively low values of second order susceptibility of these crystals, and the low beam intensity of a diode laser, a long single crystal usually is required to achieve appreciable power conversion to the second harmonic tensor.

In general, classical phase-matching (e.g., via angle or thermal tuning) requires a certain combination of intrinsic birefringence and dispersion of refractive indices. New small molecular weight crystalline organic nonlinear optical materials with high second harmonic susceptibility have been reported in literature such as ACS Symposium, Series No. 233, pages 1-26, 1983 by Garito et al. These organic materials usually possess high intrinsic birefringence and positive dispersion so that phase matching can be achieved with a single crystal.

An alternative means to achieve phase matched conditions is the use of dispersion properties for different modes in a waveguide. Since the energy is confined laterally to a narrowly constricted space, a high light intensity is possible with a relatively low power source. In this approach, one usually excites a lower order mode of the fundamental beam and the second harmonic generated propagates in a higher order mode. If the waveguide geometry and refractive indices of the guiding region and cladding region are such that:

$$\Delta\beta = \Theta_n(\omega_3) - \beta_m(\omega_2) - \beta_2(\omega_1) = 0 \text{ tm (1)}$$

then the phase matching condition is established. Here, $\beta_i$ is the propagation constant of the i-th mode. The conversion efficiency is generally quadratically dependent on the overlap integral between the two modes:

$$\int E_n(\omega_3, z) E_m(\omega_2, z) E_1(\omega_1, z) dz$$

where E is the normalized electric field of the mode across the waveguide. In general, the overlap between the waveguide modes is limited, and the value of the overlap integral is also small. This approach has been utilized for phase matching in waveguides derived from organic materials, as reported in Optics Commun., 47, 347 (1983) by Hewig et al.

Of interest with respect to the present invention is literature relating to spatially periodic nonlinear thin film waveguide structures for frequency conversion of electromagnetic energy, such as that described in U.S. Pat. No.4,865,406.

Variation in the thickness dimension of thin film waveguides is a serious problem for purposes of frequency conversion devices. To construct thin film frequency doubling waveguide devices that are phase matchable over a waveguide length greater than one centimeter, it is essential that the waveguide structure is insensitive to dimensional variations. Waveguide thin film thickness fluctuations cause dephasing of the fundamental and harmonic beams and a consequential loss of frequency conversion efficiency.

There is continuing interest in the development of inorganic and organic short wavelength laser modules which can be fabricated to operate efficiently as frequency doubling devices.

Accordingly, it is an object of this invention to provide a short wavelength laser source by the frequency doubling of an input laser beam.

It is another object of this invention to provide a short wavelength laser source by efficient frequency conversion of an input long wavelength laser beam in an organic nonlinear optical waveguide.

It is another object of this invention to provide a method for fabricating a polymeric thin film waveguide medium which is insensitive to thickness fluctuations to first order in an expansion of the waveguide coherence length as a function of thickness.

It is a further object of this invention to provide an all-optical polymeric nonlinear optical waveguide with a spatial periodic structure for modulation of second order susceptibility, and quasi-phase matching for frequency doubling of an input 700-1300 nm laser beam with increased frequency conversion efficiency.

Other objects and advantages of the present invention shall become apparent from the accompanying description and drawings

DESCRIPTION OF THE INVENTION

One or more objects of the present invention are accomplished by the provision of a waveguide device for frequency doubling of a laser beam which comprises a thin film waveguide medium which exhibits second order nonlinear optical response, wherein the derivative of the propagation constant difference $\Delta K (cm^{-1})$ to the waveguide medium thickness d is equal to zero:

$$\frac{\partial \Delta K}{\partial d} = 0$$

and the maximum phase matching waveguide length L is defined by the expression:

$$L \leq \frac{2\sqrt{2}}{\frac{(\delta d)^2}{\frac{\partial^2 \Delta K}{\partial d^2}}}$$

where $\Delta K = K^{2\omega} - 2K^{\omega}$, and $K^{\omega}$ and $K^{2\omega}$ are the waveguide medium propagation constants of the fundamental and second harmonic frequencies, and $\delta d$ is the root mean square fluctuation in the waveguide thickness.

In another embodiment this invention provides a process for producing a short wavelength laser source which comprises (1) introducing a 700-1300 nm laser beam into an optical polymer waveguide medium which exhibits second order nonlinear optical response, and in which the derivative of the propagation constant difference to the waveguide medium thickness is equal to zero:

$$\frac{\partial \Delta K}{\partial d} = 0$$

and the maximum phase matching waveguide length is defined by the expression:

$$L \leq \frac{2\sqrt{2}}{\frac{(\delta d)^2}{\frac{\partial^2 \Delta K}{\partial d^2}}}$$

where $\Delta K = K^{2\omega} - 2K\omega$, and $K^{107}$ and $K^{2\omega}$ are the waveguide medium propagation constants of the fundamental and second harmonic frequencies, and $\delta d$ is the root mean square fluctuation in the waveguide thickness; and (2) doubling the frequency of the propagating radiation to provide an output 350-650 nm laser beam.

A present invention optical waveguide can be an inorganic medium such as lithium niobate, or can be an organic medium. An organic thin film waveguiding medium can consist of a polymeric phase that contains nonlinear optically active and dipolar chromophores. The chromophores can be incorporated as homogeneously dispersed guest molecules in the polymeric phase, or can be covalently bonded within the polymer main chain or as pendant side chains.

The organic thin film waveguiding medium can consist of a host polymer such as poly(methyl methacrylate), and a guest organic compound which exhibits nonlinear optical response, such as 4-nitroaniline, 2-methyl-4-nitroaniline, 1-dimethylamino-4-nitronaphthalene, 2-chloro-4-nitroaniline, 4-dimethylamini-4'-nitrostilbene, 13,13-diamino-14,14-dicyanodiphenoquinodimethane, and the like. A host polymer can be selected which also exhibits nonlinear optical response.

An invention organic thin film waveguiding medium preferably has side chain polymers in the waveguiding medium and in cladding thin films, which are characterized by a recurring monomeric unit corresponding to the formula:

$$\begin{array}{c} +P'+ \\ | \\ S' \\ | \\ M' \end{array}$$

where P' is a polymer main chain unit, S' is a flexible spacer group having a linear chain length of between about 2-20 atoms, M' is a pendant group which exhibits second order nonlinear optical susceptibility, and where the pendant groups comprise at least about 25 weight percent of the polymer, and the polymer has a glass transition temperature or softening point above about 40° C.

Among the preferred types of side chain polymers are those characterized by a recurring monomeric unit corresponding to the formula:

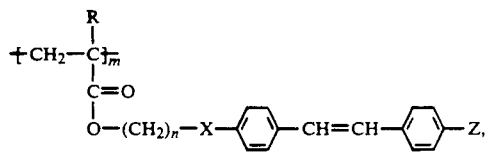

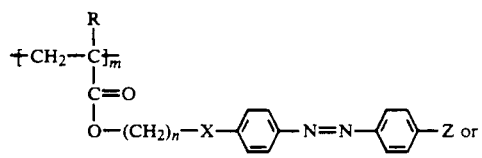

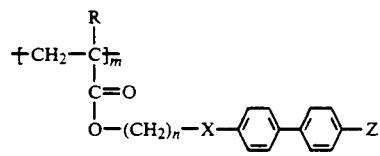

where m is an integer of at least 5; n is an integer between about 2-20; X is —NR—, —O— or —S—; R is hydrogen or a $C_1$-$C_4$ alkyl; and Z is —NO$_2$, —CN, —CF$_3$, —CH=C(CN)$_2$, —C(CN)=C(CN)$_2$ or —SO$_2$CF$_3$.

Side chain polymers of interest are described in U.S. Pat. Nos. 4,894,066; 4,762,912; 4,779,961; 4,801,670; and 4,808,332. Illustrative of side chain polymers species are poly[6-(4-nitrobinphenyloxy)hexyl methacrylate], poly(L-N-p-nitrophenyl-2-piperidinemethyl acrylate), and stilbene-containing polymers such as a copolymer of 4-[N-(2-methacroyloxyethyl)-N-methylamino]-4'-nitrostilbene and a $C_1$-$C_6$ alkyl acrylate or methacrylate:

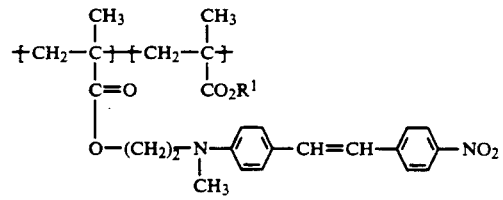

Useful amorphous side chain polymers are described in U.S. Pat. No. 5,002,361 issued on Mar. 26, 1991.

A polymeric waveguiding medium in an invention frequency converting waveguide device is transparent, preferably amorphous in physical properties, and exhibits nonlinear optical response. The polymeric waveguiding medium has a higher refractive index (e.g., 1.6) than the surrounding proximate matrix which interfaces the waveguiding medium surfaces.

Multiple polymeric thin films in a laminated matrix structure can be applied to the supporting substrate by conventional methods, such as spin coating, spraying, Langmuir-Blodgett deposition, and the like. The thin films typically will have a thickness between about 0.5-10 microns.

A present invention two-dimensional waveguide channel typically will have dimensions in the range of about 1.5-10 μm ×0.5-10 cm, and under wave propagating conditions will exhibit an optical loss of less than about 2 dB/cm.

A supporting substrate in an invention waveguide can be constructed of any convenient non-conducting medium such as plastic, glass, or silicon.

The term "transparent" as employed herein refers to a polymeric waveguiding medium which is transparent or light transmitting with respect to incident fundamental and created light frequencies. Under operational conditions with a frequency converting waveguide device, the polymeric waveguiding nonlinear optical medium is transparent to both the incident and exit light frequencies.

The term "amorphous" as employed herein refers to a transparent polymeric optical medium which does not have crystalline regions with a preferred short range molecular order and a higher density that can act as optically scattering centers.

The term "electric field" as employed herein refers to a high voltage electric field which is applied to a substrate of mobile molecules to induce dipolar alignment of the molecules parallel to the field.

For purposes of quasi-phase matching of fundamental and harmonic beams, a present invention frequency converting waveguide medium is constructed with a periodic nonlinear optical modulation zone. The periodicity of a waveguide NLO modulation zone preferably is accomplished by poling with an electric field to achieve molecular orientation of NLO-active polymer side chains parallel to the direction of the electric field, and at least one electrode has a grating configuration. The poling induces a macroscopic noncentrosymmetry in the poled domains of the polymer medium, and establishes second order nonlinear optical susceptibility in the polymer medium.

Poling of a present invention optical waveguide laminated matrix of side chain polymers in the waveguiding channel and the cladding thin films can be accomplished conveniently by heating the matrix near its melting point or glass transition temperature, then applying a DC electric field (e.g., 50-300 V/μm) to the matrix to align side chain dipoles in uniaxial orientation. The matrix then is cooled while the matrix is still under the influence of the applied DC electric field. In this manner a stable and permanent molecular orientation is immobilized in a rigid structure within the poled domains.

The thin film electrode layers in an optical waveguide matrix typically are composed of a conductive medium such as aluminum, silver or gold. A thin film metal electrode can be applied by electron beam vacuum deposition or electroplating means, and normally will have a thickness between about 0.1-4 micron.

The poling can be applied to a polymer medium that is substrate-supported, by an appropriate placement of an upper and lower pair of electrodes, at least one of which has a grating configuration.

Under operational conditions with an invention optical waveguide device, the input laser beam power is between about 0.05-1 watt when the output laser beam power is at least about one milliwatt.

The input laser beam typically is in a transverse magnetic (TM) polarization mode, and the propagating mode of the input wave energy is zero-ordered.

A present invention optical frequency converting device can be designed with the following material specifications:

| | |
|---|---|
| Nonlinear optical susceptibility $\chi^{(2)}$ | $1 \times 10^{-8}$ esu |
| Coherence length | 9.5 μm |
| Refractive index | 1.58 |
| Absorption cut-off frequency | 450 nm |

A present invention optical frequency conversion system is characterized by efficient frequency doubling of input laser wave energy, confinement of the propagating wave energy for provision of a high power density, and matching between the fundamental and harmonic frequencies.

Quasi-phase matching requires a grating in the $\chi^{(2)}$ waveguiding medium which can be obtained by photobleaching or electric field poling of the waveguiding medium in a periodic pattern. As described in Appl., Phys. Lett., 57, 977 (1990) by G. Khanarian et al, the periodicity is defined by the equation:

$$\Lambda = \frac{\pi}{\Delta K}$$

where $\Delta K = K^{2\omega} - 2K^{107}$. Both the fundamental and harmonic waves are in zero order modes and of the same polarization utilizing the largest $d_{33}$ coefficient.

Another means of phase matching in a $\chi^{(2)}$ waveguiding medium involves birefringence. Electric field poling induces a birefringence in the waveguiding medium. If the birefringence effect is equal to the dispersion between the fundamental and harmonic beams, then phase matching can be achieved. Both the fundamental and harmonic beams are in zero order modes, and orthogonal to each other utilizing the off diagonal $d_{31}$ tensor element. If an insufficient birefringence is generated, a periodic pattern can be introduced into the waveguiding medium for phase match tuning (see chapter II-1 in "Nonlinear Optical Properties Of Organic Molecules And Crystals", Academic Press, 1987; J. Zyss and D. S. Chemla).

The same text also describes modal dispersion, in which the fundamental beam propagates in a lower order mode (e.g., zeroth) and the harmonic beam propagates in a higher order mode. The beams can utilize either diagonal or odd diagonal tensor elements.

Appl. Phys. Lett., 17, 447 (1970) by P. K. Tien et al describes Cerenkov phase matching which involves the fundamental beam propagating through the $\chi^{(2)}$ waveguiding medium and the harmonic beam radiating into a transparent cladding layer. The waveguiding medium thickness is adjusted so that the propagation constant of the harmonic radiation in the cladding layer equals the fundamental waveguided mode constant. This method of phase matching utilizes the largest $d_{33}$ coefficient.

In practice an invention frequency converting device can be utilized in combination with a transverse magnetic (TM) polarized laser radiation source which provides a 700-1300 nm input laser beam, a pair of prism coupling means which couple the laser beam to the waveguiding medium, and a utilization apparatus The coupling means can consist of a pair of prism couplers, such as Schott $SF_6$ optical glass with a high index of refraction. Optical coupling and decoupling also can be accomplished with optical diffraction gratings which are formed directly on the surface of the thin film waveguide, as described in U.S. Pat. Nos. 3,674,335; 3,874,782; and 3,990,775. Another coupling means is through the cleaved end faces of a waveguiding structure.

$$l_c(\text{eff}) = \frac{\pi}{\Delta K}$$

Figure 1:
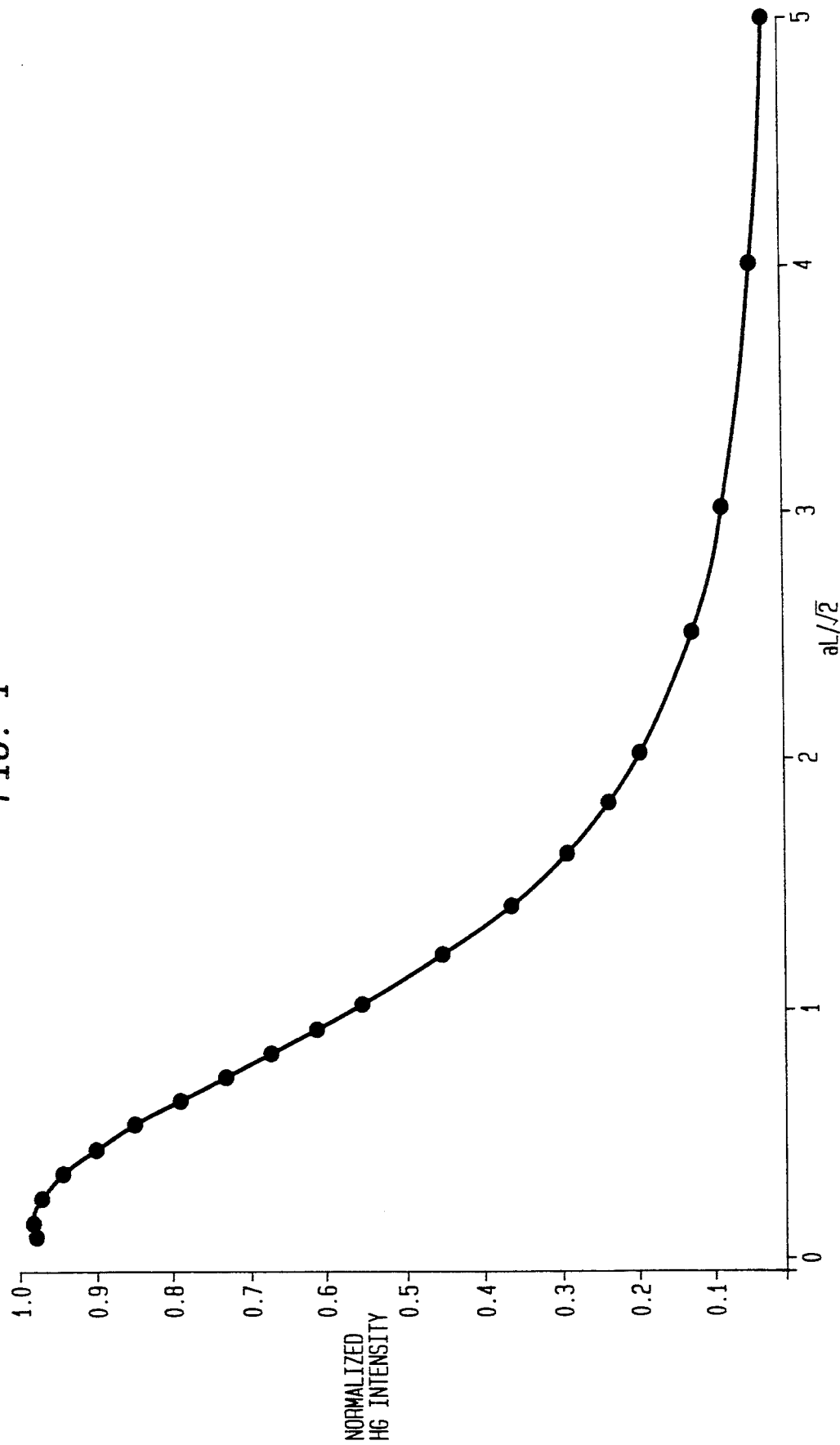
FIG. 1 is a graphic representation illustrating decrease in normalized second harmonic intensity versus random fluctuation in propagation constant. In the graph "a" is the root mean square fluctuation in $\Delta K$, and "L" is the length of the frequency converting waveguide.
Figure 2:
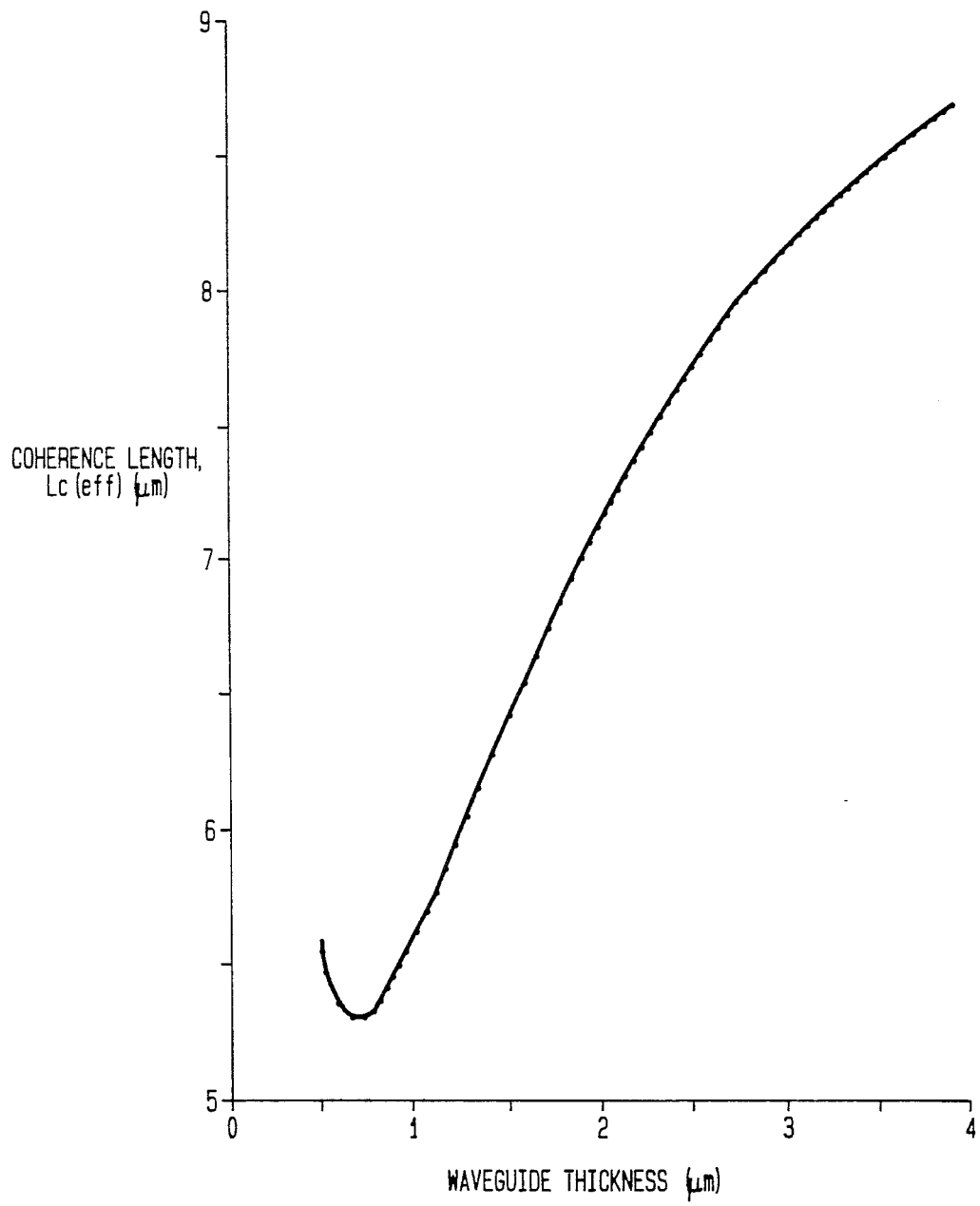
FIG. 2 is a graphic representation of coherence length (μm) relative to waveguide thickness, as described in the Example. $l_c$ (eff) is proportional to the inverse of $\Delta K$ of FIG. 3, and changes with the thickness of the waveguiding medium.
Figure 3:
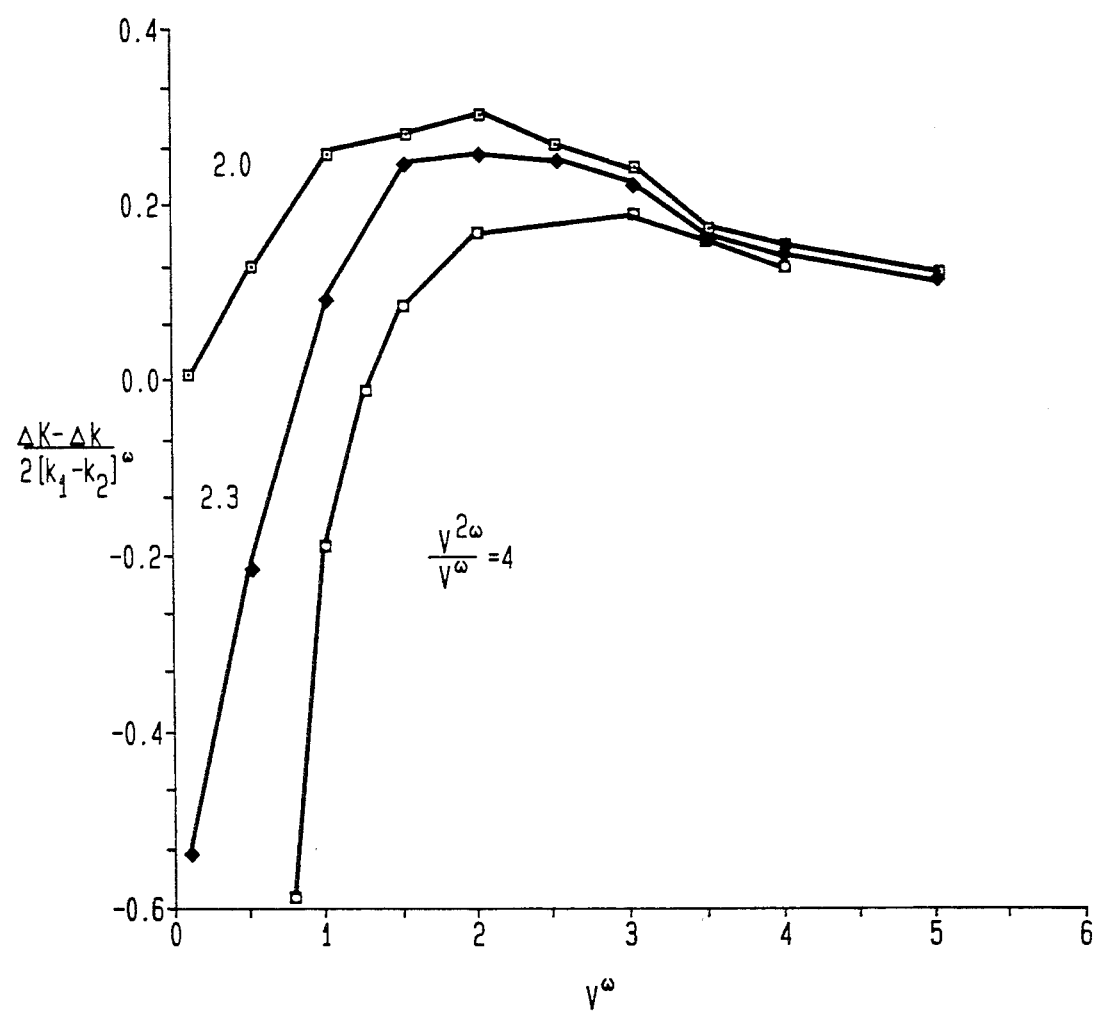

FIG. 3 is a graphic representation of generalized dispersion of a frequency converting waveguide versus normalized frequency parameter $V\omega$. In FIG. 2, $\Delta K$ is the difference of propagation constants in the waveguide, $\Delta k$ is the difference of propagation constants in the nonlinear optical waveguiding material, and $k_1^\omega$ and $k_2^\omega$ are the propagating constants at the fundamental frequency $\omega$ in the guiding and cladding materials, respectively. The normalized frequency parameter $V^\omega$ has the following relationship to refractive indices:

$$V^\omega = \frac{2\pi d}{\lambda} \sqrt{n_1^2 - n_2^2}$$

where d is thickness, $n_1$ and $n_2$ are waveguide and cladding refractive indicies, and $\lambda$ is the wavelength.

FIG. 3 illustrates that the vertical axis dispersion has a zero slope as a function of frequency parameter $V^\omega$, for certain values of $V^\omega$. The position of the maximum point changes in relation to the amount of dispersion in the waveguide. A zero slope dispersion is a general property of second harmonic generating waveguides.

The following example is further illustrative of the present invention. The optical waveguide device components are presented as being typical, and various modification in design and operation can be derived in view of the foregoing disclosure within the scope of the invention.

EXAMPLE

This Example illustrates the construction and operation of an optical frequency converting module as represented in FIG. 2, which is insensitive to thickness fluctuations.

A commercially available silicon dioxide coated silicon wafer is placed in a Varian electron beam vacuum deposition system, and a 200 Å aluminum layer is deposited. Az 1518 positive photoresist (Hoechst) is spin coated on the aluminum layer with a Solitec model 5100 coater. A 1.5 μm photoresist coating is achieved by spinning at 500 rpm for 30 seconds. The photoresist coating is patterned by placing the wafer in contact with a mask of desired periodicity in a Karl Suss MJB 3 mask aligner and exposing the masked coating to 405 nm radiation (70 mJ/cm$^2$). The patterned photoresist is developed with AZ developer in water (1:1) over a period of 60 seconds, and the developing cycle is terminated by washing with deionized water. The photoresist coating is baked in a vacuum oven at 120° C. for 45 minutes. The exposed aluminum pattern is etched with type A etchant (Transene Corp.) at 50° C. for 20 seconds and the etched surface is rinsed with deionized water. The photoresist is removed by washing with acetone and rinsing with deionized water. The periodicity of the grating electrode is 10 μm.

A 15% by weight solution of polymethyl methacrylate in cyclohexanone is spun at 1200 rpm to form a 2 μm thick film as lower cladding layer, and the film is dried in an oven at 160° C. for 2 hours. A 15% by weight solution of a copolymer (50/50) of methyl methacrylate/4-(6-methacroyloxyhexyloxy)--4'-nitrostilbene ($T_g$, 90° C.) in cyclohexanone is spun at 9000 rpm to from a 0.7 μm film as the waveguiding layer. The film is dried in an oven for 2 hours at 160° C. A 15% by weight solution of polymethyl methacrylate in cylcohexanone is spun at 1200 rpm to provide a 2 μm thick film as a top cladding and the film is dried in an oven at 160° C. for 2 hours. An aluminum top electrode is deposited in a Varian electron beam deposition system to a film thickness of 1000 Å on the top cladding layer.

Wires are bonded to the two electrodes, and the laminated structure is placed in a Mettler hot stage and heated to 90° C. A voltage is applied across the waveguide to provide a field of 75 V/μm, and the polymeric waveguiding medium is poled in a periodic pattern. The waveguide structure then is cooled to room temperature while maintaining the electric field. The waveguide device is placed on a rotation stage, and a 1.3 μm light from a laser system (10 ns, 0.1 mJ) is coupled with lenses into the waveguide. A photomultiplier tube with narrow band interference filter (0.65 μm) is utilized in the detection system. The waveguide device is rotated until the correct periodicity is obtained. A large increase in second harmonic intensity is observed, indicating that the poled waveguiding medium has achieved quasi-phase matching of fundamental and second harmonic waves.

What is claimed is:

1. In a method of fabricating a multilayer waveguiding frequency doubler capable of converting a fundamental frequency to its second harmonic frequency which includes providing at least one periodic electrode structure, waveguide and cladding layers and wherein the frequency doubler has a thickness-dependent coherence length, the improvement which comprises providing a waveguiding layer having a thickness at which the derivative of coherence length with respect to thickness is essentially zero.

2. A method in accordance with claim 1 wherein the waveguiding layer is inorganic.

3. A method in accordance with claim 1 wherein the waveguiding layer is lithium niobate.

4. A method in accordance with claim 1 wherein the waveguiding layer is organic.

5. A method in accordance with claim 1 wherein the waveguiding layer is a polymer with an external fieldinduced noncentrosymmetric molecular orientation of pendant side chains, and the polymer is characterized by a recurring monomeric unit corresponding to the formula:

where P' is a polymer main chain unit, S' is a flexible spacer group having a linear chain length of between about 2-20 atoms, M' is a chromophore which exhibits second order nonlinear optical response, and wherein the pendant side chains consist of at least about 10 weight percent of the polymer, and the polymer has a glass transition temperature above about 40° C.

6. A method in accordance with claim 1 wherein the waveguiding layer has a two-dimensional channel structure for intensified single mode wave transmission.

7. A method in accordance with claim 1 wherein the device is adapted for frequency doubling of a 700-1300 nm laser beam.

8. A method in accordance with claim 1 wherein the device includes a pair of electrodes for the application of an electric field to the waveguide layer.

* * * * *

UNITED STATES PATENT AND TRADEMARK OFFICE
CERTIFICATE OF CORRECTION

PATENT NO. : 5,131,068
DATED : July 14, 1992
INVENTOR(S) : G. Khanarian, et. al.

It is certified that error appears in the above-indentified patent and that said Letters Patent is hereby corrected as shown below:

On the Title page, items [19] and [75] inventor: "Kanarian" should be--Khanarian--.

Signed and Sealed this

Seventh Day of September, 1993

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,131,068
DATED : July 14, 1992
INVENTOR(S) : GARO KHANARIAN AND ROBERT NORWOOD It is certified that error appears in the above-indentified patent and that said Letters Patent is hereby corrected as shown below:

Col. 2, line 1, delete the entire formula and substitute therefor:

$$\Delta\beta = \beta_n(\omega_3) - \beta_m(\omega_2) - \beta_l(\omega_1) = 0$$

Col. 2, line 3, delete "$\beta_1$" and insert -- $\beta_i$ -- therefor.

Col. 2, line 7, delete "$f$" and insert -- $\int$ -- therefor.

Col. 3, line 11, delete "$K^{2\omega}312K^\omega$" and insert -- $K^{2\omega}-2K^\omega$ -- therefor.

Col. 3, line 37, delete "$2K\omega$" and insert -- $2K^\omega$ -- therefor.

Col. 3, line 37, delete "$K^{107}$" and insert -- $K^\omega$ -- therefor.

Col. 6, line 36, delete "$2K^{107}$" and insert -- $2K^\omega$ -- therefor.

Col. 7, line 31, delete "$V\omega$" and insert -- $V^\omega$ -- therefor.

UNITED STATES PATENT AND TRADEMARK OFFICE
CERTIFICATE OF CORRECTION

PATENT NO. : 5,131,068

DATED : July 14, 1992

INVENTOR(S) : GARO KHANARIAN AND ROBERT NORWOOD

It is certified that error appears in the above-indentified patent and that said Letters Patent is hereby corrected as shown below:

Col. 7, line 31, delete "FIG. 2" and insert -- FIG. 3 -- therefor.

Signed and Sealed this

Twenty-third Day of November, 1993

Attest:

BRUCE LEHMAN

Attesting Officer

Commissioner of Patents and Trademarks